US010692212B2

(12) United States Patent
Lyu

(10) Patent No.: US 10,692,212 B2
(45) Date of Patent: *Jun. 23, 2020

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventor: Yang Lyu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/102,693

(22) Filed: Aug. 13, 2018

(65) Prior Publication Data
US 2018/0357764 A1 Dec. 13, 2018

Related U.S. Application Data

(63) Continuation of application No. 15/225,915, filed on Aug. 2, 2016, now Pat. No. 10,049,449.

(30) Foreign Application Priority Data

Sep. 21, 2015 (CN) .......................... 2015 1 0603686
Mar. 31, 2016 (CN) .......................... 2016 1 0200285

(51) Int. Cl.
G06T 7/00 (2017.01)
G06T 11/60 (2006.01)
(Continued)

(52) U.S. Cl.
CPC .............. *G06T 7/0012* (2013.01); *G06K 9/00* (2013.01); *G06T 5/00* (2013.01); *G06T 7/11* (2017.01);
(Continued)

(58) Field of Classification Search
CPC ... A61B 2090/101; A61B 6/037; A61B 6/508; A61B 6/548; A61B 5/0035; A61B 5/055;
(Continued)

(56) References Cited

U.S. PATENT DOCUMENTS 5,598,453 A * 1/1997 Baba ...................... A61B 6/032
378/146
7,173,248 B2 2/2007 Ross et al.
(Continued)

FOREIGN PATENT DOCUMENTS

CN 102018523 A 4/2011
CN 103054605 A 4/2013
(Continued)

OTHER PUBLICATIONS

First Office Action in Chinese Application No. 201510603686.8 dated Dec. 4, 2019, 23 Pages.
(Continued)

Primary Examiner — Aklilu K Woldemariam
(74) Attorney, Agent, or Firm — Metis IP LLC

(57) ABSTRACT

A system and method relating to image processing are provided. The method may include the following operations. First data at a first bed position and second data at a second bed position may be received. The first bed position and the second bed position may have an overlapping region. A first image and a second image may be reconstructed based on the first data and the second data, respectively. Third data and fourth data corresponding to the overlapping region may be extracted from the first data and the second data, respectively. Merged data may be generated by merging the third data and the fourth data. A third image may be reconstructed based on the merged data. A fourth image may be generated through image composition based on the first image, the second image, and the third image.

20 Claims, 9 Drawing Sheets

(51) Int. Cl.
   *G06T 5/00*      (2006.01)
   *G06T 11/00*     (2006.01)
   *G06T 7/60*      (2017.01)
   *G06K 9/00*      (2006.01)
   *G06T 7/11*      (2017.01)
   *G06T 7/13*      (2017.01)
   *G06T 7/70*      (2017.01)

(52) U.S. Cl.
   CPC ............ *G06T 7/13* (2017.01); *G06T 7/60*
         (2013.01); *G06T 7/70* (2017.01); *G06T 11/003*
         (2013.01); *G06T 11/006* (2013.01); ***G06T
         11/60*** (2013.01); *G06T 2207/10072* (2013.01);
                         *G06T 2207/20112* (2013.01)

(58) Field of Classification Search
   CPC ....... A61B 5/7425; A61B 6/032; A61B 6/463;
         A61B 6/469; A61B 6/486; A61B 6/5235;
         A61B 6/5247; A61B 6/5264; A61B
         8/5261; A61B 6/5241; A61B 5/0456;
         A61B 6/027; A61B 6/4085; A61B 6/488;
         A61B 6/504; A61B 6/5205; A61N
         2005/1061; A61N 5/10; A61N 5/1042;
         A61N 5/1047; A61N 5/1049; A61N
         5/1067; A61N 5/1082; G06T 11/006;
         G06T 2211/424; G06T 11/003; G06T
         11/60; G06T 2207/10072; G06T
         2207/20112; G06T 5/00; G06T 7/0012;
         G06T 7/004; G06T 7/0081; G06T 7/0085;
         G06T 7/60; G06T 2207/20036; G06T
         2207/30101; G06T 2207/30172; G06T
         7/11; G06T 7/174; G06T 7/187; G06T
         2207/20101; G06T 2207/20221; G06T
         2211/412; G06T 2211/421; G06T 7/2033;
         G06T 7/33; G06T 2207/10104; G06T
         2207/30004; G06T 7/20; G06T 7/262;
         G06T 11/008; G06T 2200/32; G06T
         2210/41; G06T 3/4038; G06T
         2207/20044; G06T 7/155; G06T
         2207/30056; G06T 7/136; G06T 7/143;
         G06T 11/005; G01R 33/283; G01R
         33/4835; G01R 33/543; G01R 33/5608;
         G01R 33/56308; G06F 19/321; G01T
                                   1/2985; G01T 1/1642
   USPC ............. 382/128, 129, 130, 131, 132, 103
   See application file for complete search history.

(56) References Cited

U.S. PATENT DOCUMENTS

| | | | | |
|---|---|---|---|---|
| 9,092,691 | B1* | 7/2015 | Beaumont | ............ G06T 7/0014 |
| 9,582,906 | B2 | 2/2017 | Ra et al. | |
| 2004/0184579 | A1* | 9/2004 | Mihara | .................... A61N 5/10 |
| | | | | 378/65 |
| 2005/0129295 | A1 | 6/2005 | Shanmugam et al. | |
| 2006/0081784 | A1 | 4/2006 | Ross et al. | |
| 2006/0133693 | A1* | 6/2006 | Hunt | ........................ G06T 3/606 |
| | | | | 382/293 |
| 2007/0217567 | A1* | 9/2007 | Noshi | ..................... A61B 6/032 |
| | | | | 378/4 |
| 2009/0003655 | A1 | 1/2009 | Wollenweber | |
| 2009/0123048 | A1* | 5/2009 | Leroux | ................. G06T 11/006 |
| | | | | 382/131 |
| 2009/0309595 | A1 | 12/2009 | Yatsui | |
| 2012/0002857 | A1 | 1/2012 | Song et al. | |
| 2012/0082290 | A1* | 4/2012 | Flohr | ..................... A61B 6/027 |
| | | | | 378/8 |
| 2012/0219201 | A1 | 8/2012 | Ida et al. | |
| 2013/0004085 | A1 | 1/2013 | Bai et al. | |
| 2013/0156282 | A1* | 6/2013 | Noda | ........................ G06T 5/20 |
| | | | | 382/131 |
| 2014/0341426 | A1* | 11/2014 | Wu | ........................ G06T 7/187 |
| | | | | 382/103 |
| 2015/0065859 | A1* | 3/2015 | Hwang | ................ A61B 8/5261 |
| | | | | 600/411 |
| 2015/0070016 | A1* | 3/2015 | Ooshima | .............. A61B 5/7425 |
| | | | | 324/309 |
| 2015/0243045 | A1* | 8/2015 | Ra | .......................... A61B 6/032 |
| | | | | 382/131 |
| 2016/0228075 | A1* | 8/2016 | Kitamura | .................. A61B 6/12 |
| 2016/0247274 | A1* | 8/2016 | Thiruvenkadam | .... G06T 7/0012 |
| 2016/0247325 | A1 | 8/2016 | Yu et al. | |
| 2017/0103549 | A1* | 4/2017 | Cherubini | ............... G01S 13/89 |

FOREIGN PATENT DOCUMENTS

| | | |
|---|---|---|
| CN | 103236048 A | 8/2013 |
| CN | 103519813 A | 1/2014 |
| CN | 103800027 A | 5/2014 |
| CN | 103971387 A | 8/2014 |
| CN | 104644205 A | 5/2015 |
| CN | 105147312 A | 12/2015 |
| CN | 105389788 A | 3/2016 |
| CN | 105913380 A | 8/2016 |
| CN | 106491151 A | 3/2017 |
| WO | WO2006064401 A2 | 6/2006 |
| WO | 2015059932 A1 | 4/2015 |

OTHER PUBLICATIONS

First office action for Chinese application No. 201510528226.3 dated Jun. 27, 2017, 9 pages.
International Search Report for PCT/CN2016/099079 dated Nov. 29, 2016, 4 pages.
Written Opinion for PCT/CN2016/099079 dated Nov. 29, 2016, 5 pages.
European Search Report in European Application No. 16815526.5 dated May 25, 2018, 12 pages.

\* cited by examiner

SYSTEM AND METHOD FOR IMAGE RECONSTRUCTION

CROSS-REFERENCE TO RELATED APPLICATIONS

This application is a continuation application of U.S. patent application Ser. No. 15/225,915, filed on Aug. 2, 2016, which claims priority of Chinese Patent Application No. 201510603686.8 filed on Sep. 21, 2015 and Chinese Patent Application No. 201610200285.2 filed on Mar. 31, 2016, the entire contents of each of which are hereby incorporated by reference.

TECHNICAL FIELD

This present disclosure relates to image processing, and more particularly, relates to a system and method for data processing in image reconstruction.

BACKGROUND

Positron emission tomography (PET) has been widely used in medicine for diagnosis and other purposes. An object, such as a patient, may be scanned with a PET system to obtain PET datasets. For a ring tomography, the raw line-of-response (LOR) may be unevenly spaced. The LORs near the center of the PET ring may be wider than those far away from the center of the PET ring. Conventional reconstruction algorithms may act on data which be pre-processed into corrected, evenly spaced histograms; however, such pre-processing may corrupt the characteristics, e.g., Poisson statistics. The axial length of the detector may be smaller than the length of the patient under examination, besides, at one bed position, an image obtained may be with a non-uniform SNR in different region.

SUMMARY

An aspect of the present disclosure relates to an image processing system. The system may include a processor and a non-transitory computer readable storage medium. When computer executable instructions are executed, the processor may be caused to perform following operations. First data at a first bed position and second data at a second bed position may be received, wherein the first and second bed position may have an overlapping region. A first image may be reconstructed based on the first data. A second image may be reconstructed based on the second data. Third data corresponding to the overlapping region may be extracted from the first data. Fourth data corresponding to the overlapping region may be extracted from the second data. Merged data may be generated by merging the third data and the fourth data. A third image may be reconstructed based on the merged data. And a fourth image may through image composition base on the first image, the second image and the third image.

Another second aspect of the present disclosure relates to an image processing method. The method may include one or more of the following operations. First data at a first bed position and second data at a second bed position may be received, wherein the first and second bed position may have an overlapping region. A first image may be reconstructed based on the first data. A second image may be reconstructed based on the second data. Third data corresponding to the overlapping region may be extracted from the first data. Fourth data corresponding to the overlapping region may be extracted from the second data. Merged data may be generated by merging the third data and the fourth data. A third image may be reconstructed based on the merged data. And a fourth image may through image composition base on the first image, the second image and the third image.

In some embodiments, the generating of the fourth image may include weighted composition based on a first weight coefficient for the first image, a second weight coefficient for the second image, and a third weight coefficient for the third image.

In some embodiments, a sum of the first weight coefficient, the second weight coefficient, and the third weight coefficient may be a fixed value.

In some embodiments, the first data, the second data, the third data and the fourth data may be saved in a sinogram mode or a listmode.

In some embodiments, the first data, the second data, or the merged data may be corrected.

In some embodiments, the merged data may be arranged based on angle or time.

In some embodiments, the imaging system may be a Positron Emission Tomography (PET) system.

Still another aspect of the present disclosure relates to an image processing system. The system may include a processor and a non-transitory computer readable storage medium. When computer executable instructions are executed, the processor may be caused to perform following operations. An image in a first coordinate system may be obtained. A lookup table specifying a correlation between the first coordinate system and a second coordinate system may be obtained. The value of a target pixel in a first dimension in the second coordinate system may be calculated based on the lookup table and an original pixels of the image in the first coordinate system.

Still another aspect of the present disclosure relates to an image processing method. The method may include one or more of the following operations. a) An image in a first coordinate system may be obtained. b) A lookup table specifying a correlation between the first coordinate system and a second coordinate system may be obtained. c) The value of a target pixel in a first dimension in the second coordinate system may be calculated based on the lookup table and an original pixels of the image in the first coordinate system.

In some embodiments, each entry in the lookup table may include an integer part and a decimal part.

In some embodiments, the integer part of the entry in the lookup table may include an index of original pixel relating to the left boundary of a target pixel. In some embodiments, the decimal part of the entry in the lookup table may include a ratio of a first term to a second term. In some embodiments, the first term may be relative to the position of a target pixel relative to the position of a corresponding original pixel, and the second term may be relative to the pixel size of the corresponding original pixel.

In some embodiments, the operations may further include calculating a count sum. The count sum may be a sum of a count of a pixel and counts of all pixels before the pixel in the original coordinate system.

In some embodiments, the count sum may be used to calculate the value of a target pixel in a target coordinate system.

In some embodiments, the first coordinate system may be multi-dimensional. The operations further include performing b) and c) for each dimension of the first coordinate system.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "device," "unit," and/or "module" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to" or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof. It will be further understood that the terms "construction" and "reconstruction," when used in this disclosure, may represent a similar process in which an image may be transformed from data. Moreover, the phrase "image processing" and the phrase "image generation" may be used interchangeably. In some embodiments, image processing may include image generation.

Figure 1:
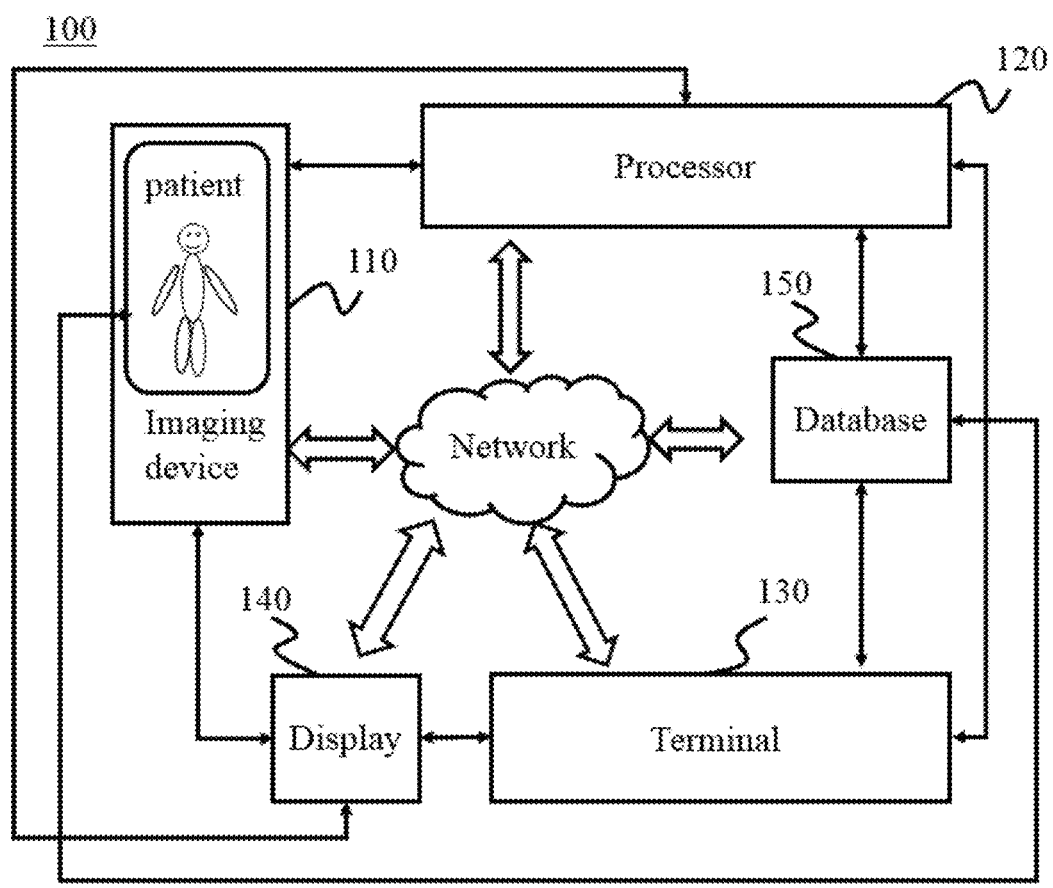
FIG. 1 is a block diagram of an imaging system 100 according to some embodiments of the present disclosure.

FIG. 1 is a block diagram of an imaging system 100 according to some embodiments of the present disclosure. In some embodiments, the imaging system 100 may be a single modality imaging system, e.g., a Digital Subtraction Angiography (DSA) system, a Magnetic Resonance Angiography (MRA) system, a Computed Tomography Angiography (CTA), a Positron Emission Tomography (PET) system, a Single Photon Emission Computed Tomography (SPECT) system, a Computed Tomography (CT) system, a Digital Radiography (DR) system, etc. In some embodiments, the imaging system may be a multi-modality imaging system, e.g., a Computed Tomography-Positron Emission Tomography (CT-PET) system, a Positron Emission Tomography-Magnetic Resonance Imaging (PET-MRI) system, a Single Photon Emission Computed Tomography-Positron Emission Tomography (SPECT-PET) system, a Digital Subtraction Angiography-Magnetic Resonance Imaging (DSA-MR) system, etc. For better understanding the present disclosure, a PET system may be described as an example of an imaging system. It should be noted that the imaging system 100 described below is merely provided for illustration purposes, and not intended to limit the scope of the present disclosure.

As illustrated in FIG. 1, the imaging system 100 may include an imaging device 110, a processor 120, a terminal 130, a display 140, and a database 150. The imaging device 110 may be configured to examine an object and generate or provide one or more images of the object. In some embodiments, the imaging device 110 may include a gantry (not shown in FIG. 1). The object may be placed within the gantry during scanning. In some embodiments, the imaging device 110 may include a bed to support the object. The object may include a substance, a cell, a tissue, an organ, a part of or a whole body of a human or an animal. Other exemplary embodiments may include but not limited to a man-made composition of organic and/or inorganic matters that are with or without life. In some embodiments, the object may be a human patient. The human patient may lie on the back, lie in prone, sit, and stand within the gantry or in front of the imaging device.

The imaging device 110 may include a detector. The detector may include a plurality of detector blocks. A detector block may include a plurality of detector elements. In some embodiments, the detector block may be flat or arc-shaped. In some embodiments, the detector may include two detector blocks. The two detector blocks may be parallel to each other. In some embodiments, the two detector blocks may be at an angle (for example, an oblique angle or a right angle) with each other. In some embodiments, the two detector blocks may be positioned symmetrically about the center of the gantry. In some embodiments, the two detector blocks may be positioned asymmetrical about the center of the gantry. In some embodiments, the detector may include two or more detector blocks. For instance, the detector may include four detector blocks. The angle between adjacent detector blocks may be approximately 90 degrees. In some embodiments, the detector may include a plurality of detectors forming a ring or a cylinder. The axial length of the detector may be, e.g., 10 centimeters, 20 centimeters, 30 centimeters, 40 centimeters, 50 centimeters, 60 centimeters, 70 centimeters, 80 centimeters, 90 centimeters, 1 meter, 1.2 meters, 1.5 meters, 1.6 meters, 1.8 meters, 2 meters, or longer than 2 meters.

In a PET system, PET tracer molecules may be introduced into the object. Positrons may be emitted by the PET tracer molecules. After moving a distance, e.g., 1 micrometer, the positrons may undergo annihilations with the electrons and may generate gamma photons. This process may be referred as a coincidence event. A coincidence event may be assigned to a line-of-response (LOR) joining the two relevant detector elements. The gamma photons may be detected by the detector of the imaging devices 110. The detector may produce electrical signals based on the detected gamma photons. In some embodiments, the electrical signals may be amplified, digitized, filtered, or may be subject to other processes to form imaging data. As used herein, the term "imaging data" may refer to the data that may be used to reconstruct an image of the object under examination. In some embodiments, the axial length of the detector may be smaller than the length of the object under examination, and therefore, the object may be scanned in a one bed position mode or a multi-bed positions mode. Besides, in the one bed position mode, imaging data detected by the detector elements toward the axial ends (i.e. toward the ends along the axial direction) of the detector may be less than those detected by the detector elements toward the axial center (i.e. toward the center along the axial direction) of the detector. Therefore, the imaging data acquired at the bed position may result in an image with a non-uniform signal noise ratio (SNR). The imaging data obtained at different bed positions may be combined to form a composite image of the object. The composite image of the object may be with a uniform or essentially uniform SNR.

In some embodiments, the number of the bed positions may be two. In some embodiments, the number of the bed positions may be larger than two, e.g., three, four, five, six, or more. For illustration purposes, the scenario using two bed positions may be described in the following description. The order of bed positions to scan the object may be arbitrary. In some embodiments, the imaging device 110 may scan the object at the first bed position at first and then at the second bed position. In some embodiments, the imaging device 110 may scan the object at the second bed position at first and then at the first bed position. In some embodiments, the duration of scanning at the first bed position may be the same as that at the second position. In some embodiments, the duration of scanning at the first position may be different from that at the second position.

The processor 120 may be configured to process the imaging data from the imaging device 110. In some embodiments, the processor 120 may be configured to perform operations including, for example, data preprocessing, image reconstruction, image correction, image composition, lookup table creation, or the like, or any combination thereof. In some embodiments, imaging data obtained in one coordinate system may need to be transformed into data in another coordinate system. The relationship between two coordinate systems may be set up by the processor. In some embodiments, the processor 120 may be configured to generate a control signal relating to the configuration of the imaging device 110. In some embodiments, the result generated by the processor 120 may be provided to other modules or units in the system including, e.g., the terminal 130, the display 140, the database 150. In some embodiments, the data from the processor 120 may be transmitted to the database 150 for storing. In some embodiments, the data from the processor 120 may be displayed by the display 140.

In some embodiments, the processor 120 may include any processor-based and/or microprocessor-based units. Merely by way of examples, the processor may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), or any other circuit or processor capable of executing the functions described herein, or the like, or any combination thereof. In some embodiments, the processor 120 may also include a memory. In some embodiments, the memory may include Random Access Memory (RAM). In some embodiments, the memory may include Read Only Memory (ROM). The processor that may be used in connection with the present system described herein are not exhaustive and are not limiting. Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

In some embodiments, the terminal 130 may be configured to receive input. The terminal 130 may include, for example, a mobile device (e.g., a smart phone, a tablet, a laptop computer, or the like), a personal computer, other devices, or the like, or any combination thereof. Other devices may include a device that may work independently, or a processing unit or processing module assembled in another device (e.g., an intelligent home terminal). The terminal 130 may include an input device, a control panel (not shown in FIG. 1), etc. The input device may be a keyboard, a touch screen, a mouse, a remote controller, or the like, or any combination thereof. An input device may include alphanumeric and/or other keys that may be inputted via a keyboard, a touch screen (for example, with haptics or tactile feedback), a voice input, an image input, an eye tracking input, a brain monitoring system, or any other comparable input mechanism. The input information received through the input device may be communicated to the processor 120 via, for example, a bus, for further processing. Another type of the input device may include a cursor control device, such as a mouse, a trackball, or cursor direction keys to communicate direction information and command selections to, for example, the processor 120 and to control cursor movement on the display device.

In some embodiments, the terminal 130 may communicate with the imaging device 110. The data input from the terminal 130 may be transmitted to the imaging device 110 to control some parameters of the imaging device 110. The parameters may include the position and the tilted angle of the bed in the imaging device 110, the scan duration, the scan times, or the like, or any combination thereof. In some embodiments, the terminal 130 may communicate with the processor 120. The terminal 130 may provide instructions to the processor 120 for the instructions to be processed in the processor 120. For example, the instructions relating to the bed positions, the reconstruction algorithm, the correction algorithm, etc., may be provided via the terminal 130. In some embodiments, the terminal 130 may communicate with the display 140 and the database 150. The data from the terminal 130 may be transmitted to the database 150 for storing.

The display 140 may be configured to display information. Exemplary information for display may include an image, a request for input or parameters relating to image acquisition and/or processing, etc. The display 140 may include a liquid crystal display (LCD), a light emitting diode (LED) based display, a flat panel display or curved screen (or television), a cathode ray tube (CRT), or the like, or any combination thereof.

The database 150 may be configured to store data. The data may be from the imaging device 110, the processor 120, the terminal 130, or other modules or units in the system. Exemplarity data may include imaging data from the imaging device 110, a lookup table, a reconstructed image, etc. In some embodiments, the database 150 may be a hard disk drive. In some embodiments, the database 150 may be a solid-state drive. In some embodiments, the database 150 may be a removable storage drive. Merely by way of examples, a non-exclusive list of removable storage drive that may be used in connection with the present disclosure includes a flash memory disk drive, an optical disk drive, or the like, or any combination thereof.

In some embodiments, the imaging device 110, the processor 120, the terminal 130, the display 140 and the database 150 may be connected to or communicate with each other directly. In some embodiments, the imaging device 110, the processor 120, the terminal 130, the display 140, and the database 150 may be connected to or communicate with each other via a network. In some embodiments, the imaging device 110, the processor 120, the terminal 130, the display 140, and the database 150 may be connected to or communicate with each other via an intermediate unit (not shown in FIG. 1). The intermediate unit may be a visible component or an invisible field (radio, optical, sonic, electromagnetic induction, etc.). The connection between different units may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof. The network that may be used in connection with the present system described herein are not exhaustive and are not limiting.

In some embodiments, the processor 120, the database 150, the display 140, or the terminal 130 may be located near the imaging device 110. In other embodiments, one or more of the above components may be remote from the imaging device 110. Merely by way for example, the processor 120 and the database 150 may be implemented on a cloud platform. The cloud platform may be a cloud computing platform or a cloud storing platform. The model of the cloud platform may include a private cloud, a public cloud, a hybrid cloud, a community cloud, a distributed cloud, an inter-cloud, a multi-cloud, or the like, or any combination thereof. As another example, the display 140, and the terminal 130 may be operated by a remote medical system.

It should be noted that the above description about the imaging system is merely provided for the purposes of illustration, and not intended to limit the scope of the present disclosure. For persons having ordinary skills in the art, multiple variations and modifications may be made under the teachings of the present disclosure. For example, the imaging system 100 may include several processors, databases, displays, terminals when the imaging system 100 is a multi-modality system. As another example, the display 140, the terminal 130, and the processor 120 may be integrated as one device. However, those variations and modifications do not depart from the scope of the present disclosure.

Figure 2:
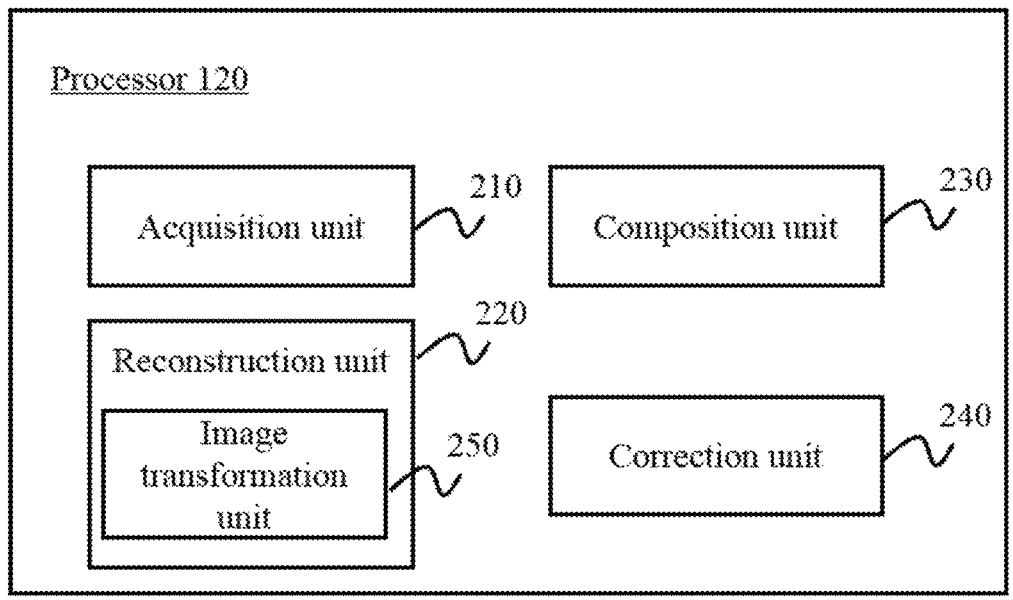
FIG. 2 is a block diagram depicting a processor according to some embodiments of the present disclosure.

FIG. 2 is a block diagram depicting a processor according to some embodiments of the present disclosure. The processor 120 may include an acquisition unit 210, a reconstruction unit 220, a composition unit 230, and a correction unit 240. The acquisition unit 210 may be configured to acquire the imaging data. In some embodiments, the imaging data may include imaging data produced in different bed positions. In some embodiments, there may be one or more overlapping regions between different bed positions. A portion of an object under examination may be scanned more than one time in some scenarios. For illustration purposes, an overlapping region may refer to the portion of an object that may be scanned more than one time at the different bed positions; an overlapping region may also refer to a same region (of an object) included in multiple images or imaging data taken at different bed positions. First overlapping imaging data may refer to imaging data of the overlapping regions produced at a first bed position. Second overlapping imaging data may refer to imaging data of the overlapping region produced at a second bed position. In some embodiments, the first overlapping imaging data and the second overlapping imaging data may be merged to form merged imaging data. The merged imaging data may be reconstructed to generate an image of the overlapping region. In some embodiments, the imaging data may be from the imaging device 110 and/or the database 150. The imaging data may be in a listmode format or in a sinogram format.

The reconstruction unit 220 may be configured to reconstruct imaging data to generate one or more images. The imaging data may be reconstructed by using a reconstruction algorithm. The reconstruction algorithm may be an analytic reconstruction algorithm, an iterative reconstruction algorithm, or based on compressed sensing (CS). The analytic reconstruction algorithm may include a filtered back projection (FBP) algorithm, a back projection filtration (BFP) algorithm, a p-filtered layergram, or the like. The iterative reconstruction algorithm may include an ordered subset expectation maximization (OSEM) algorithm, a maximum likelihood expectation maximization (MLEM) algorithm, etc.

In some embodiments, the reconstruction unit 220 may include an image transformation unit 250. The image transformation unit 250 may be configured to transform an image from a first coordinate system to a second coordinate system.

In some embodiments, the first coordinate system and the second coordinate system may be uniformly distributed, i.e., the first and second coordinate system may be linearly scaled. In some embodiments, the first coordinate system and the second coordinate system may be non-uniformly distributed. In some embodiments, one of the first coordinate system and the second coordinate system may be uniformly distributed, and the other may be non-uniformly distributed.

The composition unit 230 may be configured to composite two or more images to form a composite image. In some embodiments, the images to be composited may have an overlapping region. In some embodiments, the images to be composited may have no overlapping region. The images may be 3D images, 2D images, etc. The composite image may be a 3D image, a 2D image, etc. In some embodiments, the size of the images to be corn posited may be the same or different. For a PET system, an object under examination may be scanned at several bed positions to generate images of the object. In some embodiments, there may be an overlapping region between two adjacent bed positions and a portion of the object may be scanned at the two bed positions. At each bed position, an image may be generated. Images generated at two adjacent bed positions may include an overlapping region. For a first image taken at a first bed position and a second image taken at a second bed position, the overlapping ratio of the overlapping region with respect to a first image or a second image may be any value from 0 to 1, e.g., 10%, 20%, 30%, 40%, 50%, 60%, etc. As used herein, an overlapping ratio may refer to the ratio of the size of an overlapping region to the size of an image including the overlapping region. The size may be evaluated in terms of area, length, etc. In some embodiments, for a scan with multiple overlapping regions, the overlapping ratios may be fixed in a scan. In some embodiments, for a scan with multiple overlapping regions, the overlapping ratio may be adjustable during a scan. In some embodiments, for a scan with multiple overlapping regions, at least two overlapping ratios may be the same. In some embodiments, for a scan with multiple overlapping regions, at least two overlapping ratios may be different. In some embodiments, different scans may generate overlapping regions of different sizes. In some embodiments, different scans may generate overlapping regions of a same size. In some embodiments, the sizes of overlapping regions may be adjusted for different scans.

For illustration purposes, scenarios with two bed positions are described in detail below. First imaging data and a first image may be generated at a first bed position. Second imaging data and a second image may be generated at a second bed position. In some embodiments, there may be an overlapping region between the two bed positions; either of the two images generated at the two bed positions may include an overlapping region.

In some embodiments, first overlapping imaging data corresponding to the overlapping region in the first image may be extracted from the first image data; second overlapping imaging data corresponding to the overlapping region in the second image may be extracted from the second imaging data. The first overlapping imaging data and the second overlapping imaging data may be merged to form merged imaging data. The merged imaging data may be reconstructed to generate an image of the overlapping region, also referred to as a third image. The first image, the second image, and the third image may be composited to generate a composite image of the object. In some embodiments, the overlapping region of the first image, the overlapping region of the second image and the third image may be multiplied by a weight coefficient to form an image of the object.

The correction unit 240 may be configured to correct imaging data. The correction method may include random correction, scatter correction, attenuation correction, dead time correction, uniformity correction, or the like, or any combination thereof.

It should be noted that the above description about the processor is merely provided for the purposes of illustration, and not intended to limit the scope of the present disclosure. For persons having ordinary skills in the art, multiple variations and modifications may be made under the teachings of the present disclosure. In some embodiments, the processor may include other modules or units. For example, some modules may be omitted or integrated with other module. As another example, a storage may be added in the processor to save data. However, those variations and modifications do not depart from the scope of the present disclosure.

Figure 3:
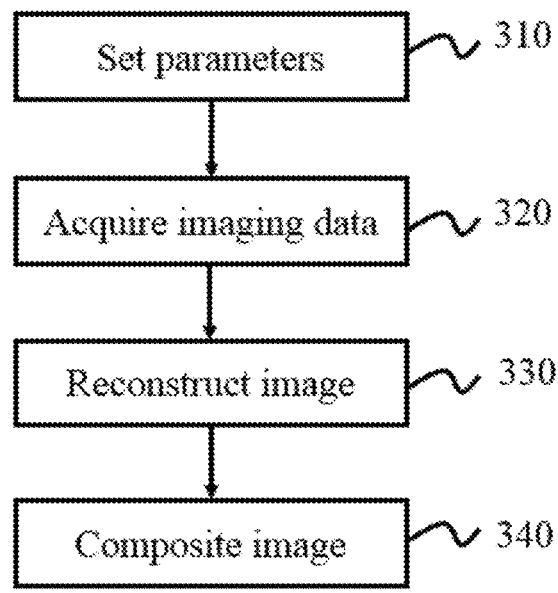
FIG. 3 illustrates a work flow for imaging processing according to some embodiments of the present disclosure.

FIG. 3 is a flowchart illustrating a process for an imaging system according to some embodiments of the present disclosure. In step 310, one or more parameters may be set. Exemplary parameters may include a height of the bed, a rotation angle of an image, a position of the bed during scanning, a scanning duration, or the like, or any combination thereof. In a multi-bed position scanning mode, exemplary parameters may further include the number of the bed positions, different bed positions, a scanning order of the different bed positions, whether to include one or more overlapping regions, a size and/or a position of an overlapping region, or the like, or any combination thereof.

In step 320, imaging data may be acquired. This step may be performed by the acquisition unit 210 in FIG. 2. In some embodiments, the imaging data may be acquired in the one bed position mode or the multi-bed positions mode. In the multi-bed positions mode, the imaging data acquired may include first imaging data when the bed is at a first bed position and second imaging data when the bed is at a second bed position. The imaging data may be in a listmode format or in a sinogram format.

In step 330, the imaging data may be reconstructed. Step 330 may be performed by the reconstruction unit 220 in FIG. 2. In some embodiments, the imaging data may be reconstructed using a reconstruction algorithm as described elsewhere in the present disclosure. In some embodiments, during reconstruction, an image may be transformed from a first coordinate system to a second coordinate system. Detailed description of an exemplary image transformation may be described in FIG. 5.

In step 340, images may be composited. In some embodiments, step 340 may be performed by the composition unit 230 illustrated in FIG. 2. For a multi-bed positions mode, the imaging data may include first imaging data when the bed is at a first bed position and second imaging data when the bed is at a second bed position. In some embodiments, the first bed position and the second bed position may overlap. In some embodiments, the first imaging data may be reconstructed to form a first image and the second imaging data may be reconstructed to form a second image. In some embodiments, the first image and the second image may be composited to form a composite image. In some embodiments, the imaging data corresponding to the overlapping region of the first image may be referred to as third imaging data, and the imaging data corresponding to the overlapping region of the second image may be referred to as fourth imaging data. In some embodiments, the third imaging data and the fourth imaging data may be merged together to form merged imaging data. The merged imaging data may be reconstructed using a reconstruction algorithm, and an image of the overlapping region may be obtained. In some embodiments, the first image, the second image, and the image of the overlapping region may be used to produce a composite image.

It should be noted that the above description about the process for an imaging system is merely provided for the purposes of illustration, and not intended to limit the scope of the present disclosure. For persons having ordinary skills in the art, multiple variations and modifications may be made under the teachings of the present disclosure. In some embodiments, other steps may be added in the process. For another example, the intermediated data and/or the final data of the process may be stored in the process, and the storage location may be in database 150 or other modules or units capable of storing data. In some embodiments, the imaging data acquired in step 320 may be corrected by the correction unit 240 before being reconstructed. However, those variations and modifications do not depart from the scope of the present disclosure.

Figure 4:
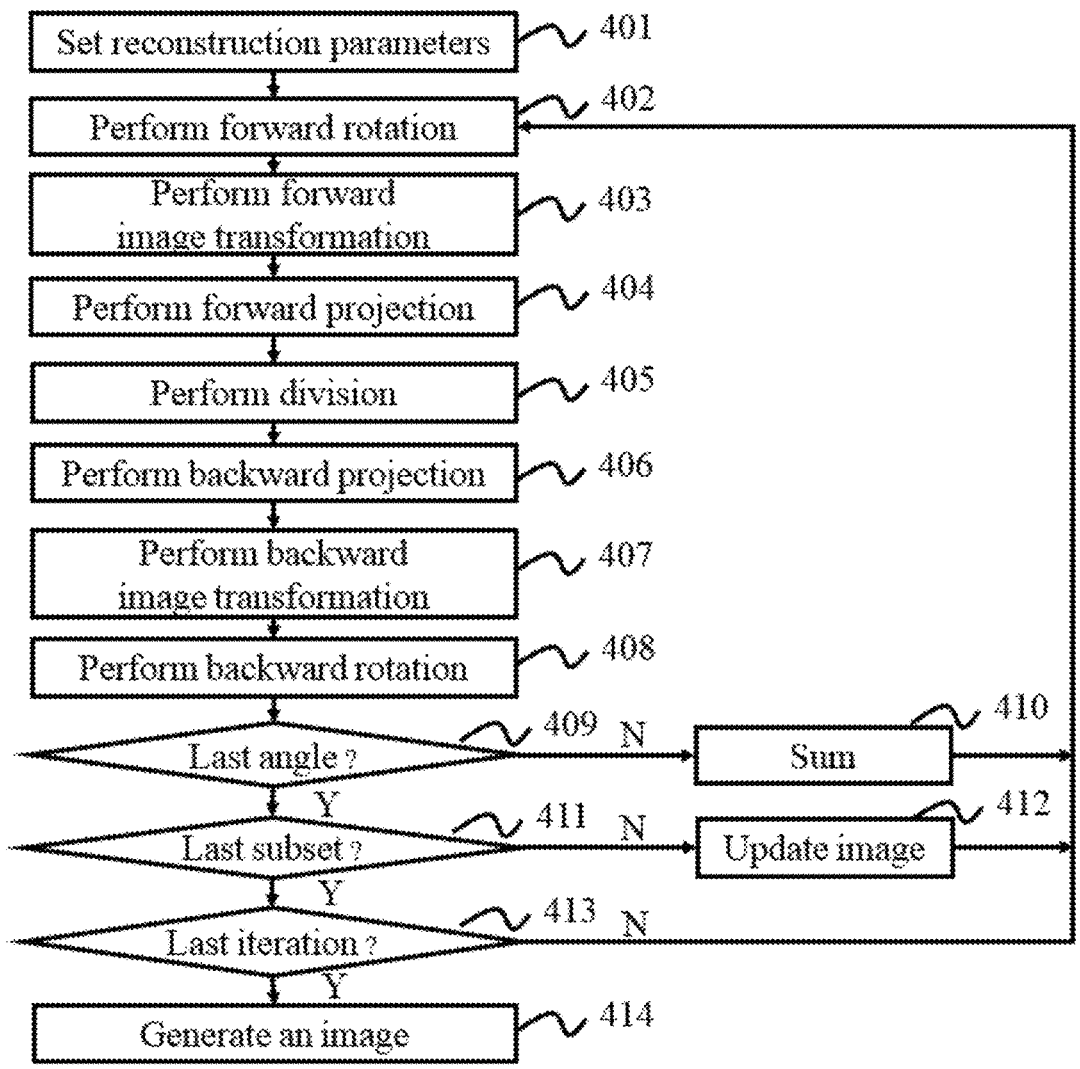
FIG. 4 illustrates a process for image reconstruction according to some embodiments of the present disclosure.

FIG. 4 shows an exemplary process of image reconstruction according to some embodiments of the present disclosure. It should be noted that an image reconstruction algorithm described is merely an example, and not intended to limit the scope of the present disclosure.

In step 401, one or more reconstruction parameters may be set. Exemplary reconstruction parameters may include a bed position mode (e.g., single bed position mode, multi-bed position mode, etc.), a height of the bed, a rotation angle of an image, the number of rotation angles, a position of the bed during scanning, a scanning duration, an iteration, the number of subsets, a system model, or the like, or any combination thereof. In a multi-bed positions mode, exemplary parameters may further include number of bed positions, different bed positions, a scanning order of the different bed positions, an overlapping region, the size and position of an overlapping region, or the like, or any combination thereof. An initial image estimate of the object may be obtained in step 401. In some embodiments, each subset may include projections at several rotation angles. In some embodiments, each subset may include projections at same number of rotation angles. In some embodiments, each subset may include projections at different number of rotation angles. For example, the first subset may include projections at three rotation angles, and the second subset may include projections at four rotation angles. The number of subsets may be an arbitrary value, including, e.g., 4, 8, 16.

For illustration purposes, an exemplary iterative reconstruction is described below. In some embodiments, the iterative reconstruction algorithm may include a maximum-likelihood expectation-maximization (MLEM) algorithm, an ordered-subsets (OSEM) algorithm, an attenuation-weighted maximum-likelihood expectation-maximization (AW-MLEM) algorithm, an attenuation-weighted ordered-subsets (AW-OSEM) algorithm, a line-of-response maximum-likelihood expectation-maximization (LOR-MLEM) algorithm, a line-of-response ordered-subsets (LOR-OSEM) algorithm, or the like, or any combination thereof. Merely by way for example, in the embodiments using LOR-OSEM algorithm, the initial image estimate of the object may be updated for a certain number of times. The number of the update times may be equal to the number of the iteration times set in step 401. In some embodiments, an image in each iteration may be rotated with a rotation angle set in step 401. In a PET system, a LOR (line-of-response) may refer to a line of coincidence connecting a pair of relevant detector elements of the detector. For a ring tomography, raw LORs may be unevenly spaced. The LORs near the center along the circumferential direction of the PET ring may be wider than those far away from the center of the PET ring. To reconstruct an image using raw LORs, the image may need to be transformed from an original coordinate system (also called a first coordinate system) to a target coordinate system (also called a second coordinate system).

In step 402, a forward rotation may be performed on the image with a present rotation angle set in step 401. In step 403, the image may be transformed from the image space to the LOR space. In step 404, a forward projection may be performed. In step 405, a division may be performed to generate a correction factor. In step 406, a backward projection may be performed based on the correction factor. In step 407, image may be performed from the LOR space to the image space. In step 408, a backward rotation may be performed. In step 409, whether the present rotation angle is the last angle may be judged. If the present rotation angle is not the last angle, result of the backward projection after the image transformation may be summed up in step 410, and then the process may return to step 402. If the present rotation angle is the last angle, a determination may be made as to whether the present subset is the last subset in step 411. If the present subset is not the last subset, the image may be updated in step 412, and then the process may return to step 402. If the present subset is the last subset, a determination may be made as to whether the present iteration is the last iteration in step 413. If the present iteration is not the last iteration, the process may return to step 402. If the present iteration is the last iteration, the reconstructed image may be generated in step 414.

It should be noted that the above description about the process of image reconstruction is merely provided for the purposes of illustration, and not intended to limit the scope of the present disclosure. For persons having ordinary skills in the art, multiple variations and modifications may be made under the teachings of the present disclosure. In some embodiments, other steps may be added in the process, for example, the intermediated data and/or the final data of the process may be stored in the process, and the storage location may be in database 150 or other modules or units capable of storing data. However, those variations and modifications do not depart from the scope of the present disclosure.

Figure 5:
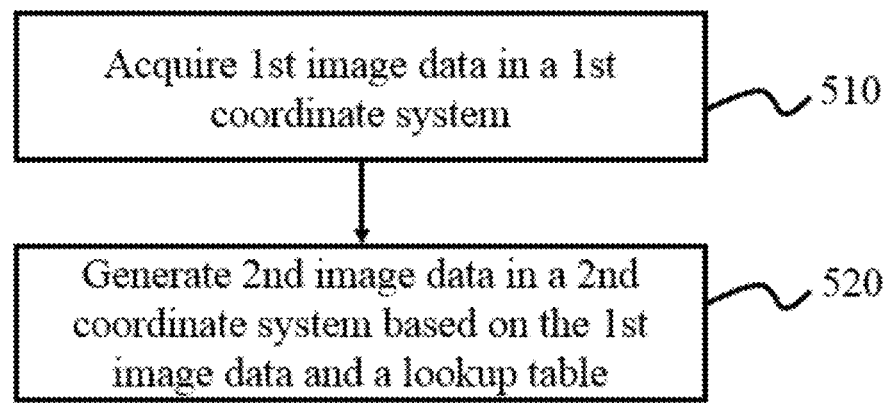
FIG. 5 illustrates a process for an image transformation according to some embodiments of the present disclosure.

FIG. 5 is a flowchart illustrating an image transformation according to some embodiments of the present disclosure. In step 510, a first image data in a first coordinate system may be acquired. As used herein, the term "image data" may refer to the values of pixels, texels, surfels, or voxels of an image. The first image data may be one-dimensional, two-dimensional, three-dimensional, or the like, or any combination thereof. In some embodiments, step 510 may be performed by the acquisition unit 210 of the processor 120.

In step 520, second image data in a second coordinate system may be generated based on the first image data and a lookup table. The dimension of the second image data may be the same with that of the first image data. The first coordinate system or the second coordinate system may be a one-dimensional coordinate system, a two-dimensional coordinate system, a three-dimensional coordinate system, or a four-dimensional coordinate system, etc. In some embodiments, the first coordinate system may be an S-T coordinate system and the second coordinate system may be an X-Y coordinate system. Merely by way for example, a value in the S-axis with respect to a PET ring may represent a distance from a LOR at an angle to the center of the PET ring; a value in the T-axis with respect to a PET ring may represent the angle between a LOR and a horizontal plane or between a LOR and a vertical plane. In some embodiments, the first coordinate system may be an X-Y coordinate system, and the second coordinate system may be an S-T coordinate system.

In some embodiments, the first coordinate system and the second coordinate system may be parallel to each other. That is, the X-axis in the second coordinate system may be parallel to the S-axis in the first coordinate system, and the Y-axis in the second coordinate system may be parallel to the T-axis in the first coordinate system. In some embodiments, the first coordinate system and the second coordinate system may be non-parallel to each other. In some embodiments, the first coordinate system and the second coordinate system may be uniformly distributed. In some embodiments, part of the first coordinate system or the second coordinate system may be non-uniformly distributed. Merely by way of example, the X-axis and the Y-axis may be uniformly distributed, and the S-axis and the T-axis may be non-uniformly distributed.

The lookup table may store a relationship between the first coordinate system and the second coordinate system. Based on the lookup table, the data in the first coordinate system may be mapped into the second coordinate system. In some embodiments, a certain configuration detector may correspond to a certain lookup table. If the configuration changes, the lookup table may change correspondingly. For a PET ring, the lookup table may relate to many factors including, for example, the radius of the PET ring, the gap between two adjacent detector blocks, or the like, or a combination thereof. In some embodiments, the lookup table may be stored in the database 150. Detailed description about the process of setting up a lookup table may be described in FIG. 8.

It should be noted that the above description about the process for an imaging system is merely provided for the purposes of illustration, and not intended to limit the scope of the present disclosure. For persons having ordinary skills in the art, multiple variations and modifications may be made under the teachings of the present disclosure. In some embodiments, other steps may be added in the process. For example, intermediated data and/or the final data of the process may be stored in the database 150 or other modules or units capable of storing data. However, those variations and modifications do not depart from the scope of the present disclosure.

Figure 6:
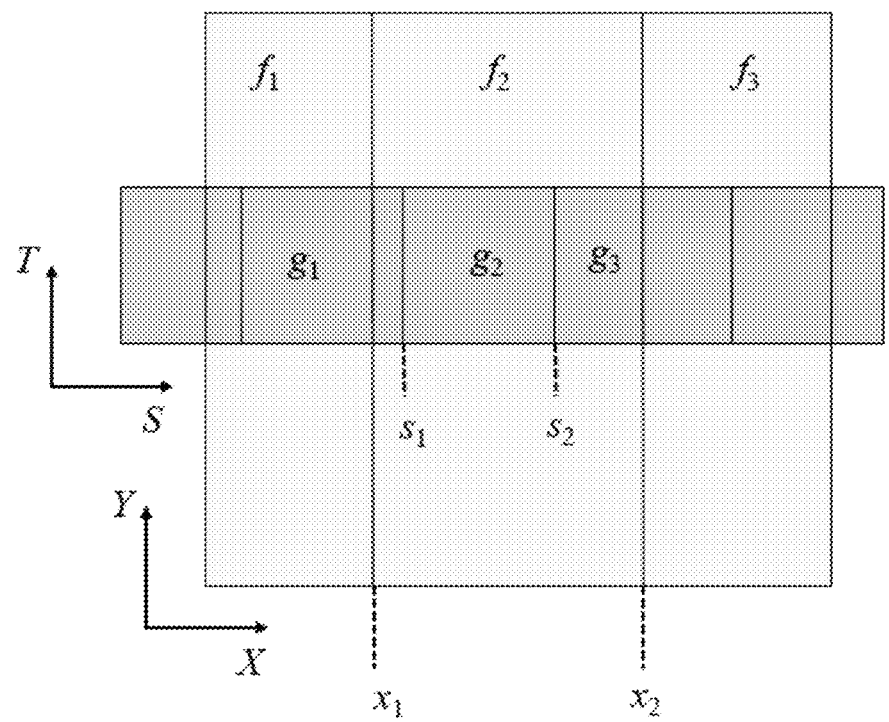
FIG. 6 illustrates an image transformation in two different coordinate systems according to some embodiments of the present disclosure.

FIG. 6 shows an image transformation in two different coordinate systems according to some embodiments of the present disclosure. For illustration purposes, image transformation in one dimension may be described below, and not intended to limit the scope of the present disclosure. The pixel values in the first coordinate system, e.g., the S-T coordinate system, may be transformed to that in the second coordinate system, e.g., the X-Y coordinate system. In a one-dimensional system, the pixel size may be represented by the length of a pixel. In a two-dimensional system, the pixel size may be represented by the area of a pixel. In some embodiments, the pixel value may be an average value for the pixel size. A pixel in the second coordinate system (called a target pixel) may relate to one or more pixels in the first coordinate system (called an original pixel). Based on the original pixels relating to a target pixel and the pixel size of the target pixel, the target pixel value may be obtained.

As shown in FIG. 6, pixels $g_1$, $g_2$, and $g_3$ are in the S-T coordinate system, and pixels $f_1$, $f_2$, and $f_3$ are in the X-Y coordinate system. In some embodiments, the pixels in the S-T coordinate system may be designated as the original pixels, and the pixels in the X-Y coordinate system may be designated as the target pixels. It should be noted that the indexes of the original pixels and the target pixels used herein are merely for the purpose of convenience, and not intended to be limiting. As shown in FIG. 6, the left boundary of the pixel $f_2$ may be indicated by $x_1$. The right boundary of the pixel $f_2$ may be indicated by $x_2$. The left boundary of the pixel $g_2$ may be indicated by $s_1$. The right boundary of the pixel $g_2$ may be indicated by $s_2$. The pixel size of the pixel $g_2$ may be $s_2-s_1$, and the pixel size of the pixel $f_2$ may be $x_2-x_1$. The left boundary of the pixel $f_2$ may be between the left boundary and the right boundary of the pixel $g_1$. The right boundary of the pixel $f_2$ may be between the left boundary and the right boundary of the pixel $g_3$. Therefore, the pixel $f_2$ may relate to the pixels $g_1$, $g_2$ and $g_3$. The value of the pixel $f_2$ may be obtained based on the pixels $g_1$, $g_2$, and $g_3$ and the pixel size of the pixel $f_2$. In some embodiments, the value of the pixel $f_2$ may be described as the expression below:

$$f[2] = \frac{(s_1 - x_1) \cdot g[1] + (s_2 - s_1) \cdot g[2] + (x_2 - s_2) \cdot g[3]}{x_2 - x_1}, \quad (1)$$

where f[2] may represent the value of pixel $f_2$, g[1] may represent the value of the pixel $g_1$, g[2] may represent the value of the pixel $g_2$, g[3] may represent the value of the pixel $g_3$, $(x_2-x_1)$ may represent the size of pixel $f_2$, $(s_2-s_1)$ may represent the size of pixel $g_2$, $(s_1-x_1)$ may represent the difference between the left boundary of the pixel $f_2$ and the right boundary of the pixel $g_1$, and $(x_2-s_2)$ may represent the difference between the right boundary of the pixel $f_2$ and the left boundary of the pixel $g_3$. The position relationship between the target pixel(s) and the original pixel(s) may be obtained based on a lookup table. In some embodiments, depending on the lookup table, the index of an original pixel corresponding to the left boundary of the target pixel may be obtained, and the distance between the left boundary of the target pixel and the left boundary of the original pixel may also be obtained. Based on the position relationship, the value of the target pixel may be estimated.

It should be noted that the above description about an image transformation is merely an example, and is not intended to be limiting. Various alterations, improvements, and modifications may occur and are intended to those skilled in the art, though not expressly stated herein. For persons having ordinary skills in the art, the number of the pixels can be varied arbitrarily and the relative position of the pixels in the first coordinate system and the second coordinate system according to some embodiments of the present disclosure. In some embodiments, a target pixel may related one or more original pixels. These alterations, improvements, and modifications are intended to be suggested by this disclosure, and are within the spirit and scope of the exemplary embodiments of this disclosure.

Figure 7A:
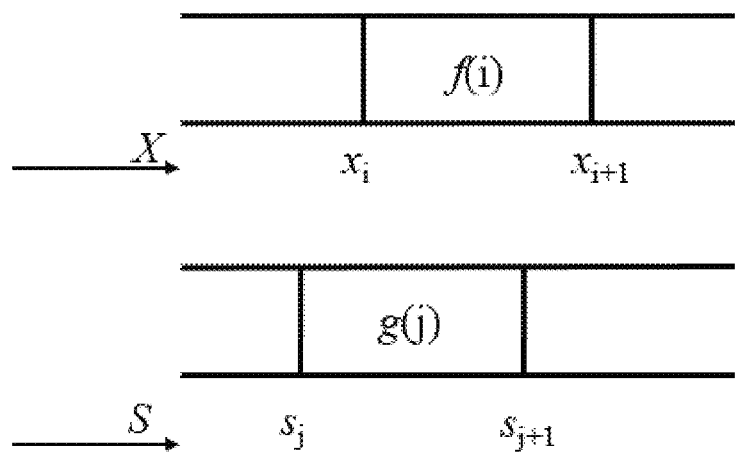
FIG. 7A and FIG. 7B show a transformation of a single-dimensional array in two different coordinate systems according to some embodiments of the present disclosure.
Figure 7B:
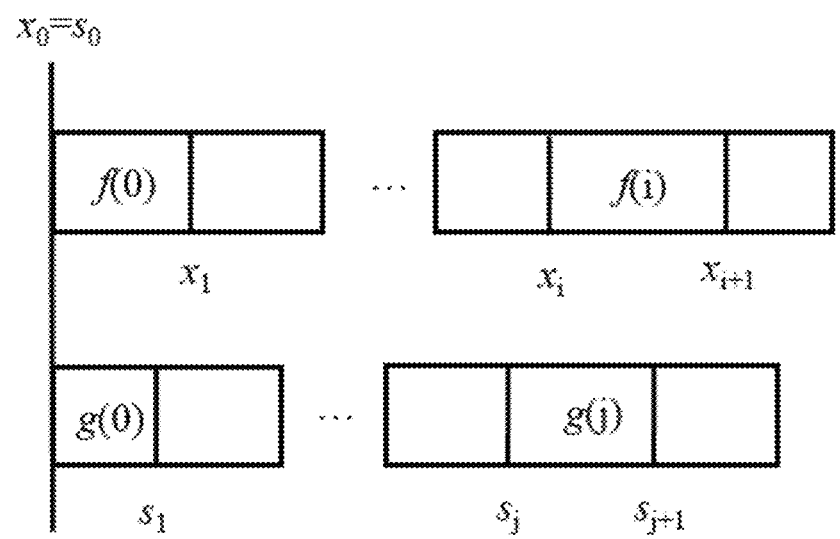

FIG. 7A and FIG. 7B show a transformation in one dimension of an image between two different coordinate systems according to some embodiments of the present disclosure. The data of an image in one dimension may be represented by a one-dimensional array. It should be noted that the one-dimensional array used herein is merely for the purpose of convenience, and not intended to be limiting. In some embodiments, the arrays may be two-dimensional, three-dimensional, or even higher dimensional. The following description may show the transformation from the S-T coordinate system to the X-Y coordinate system.

In the S-T coordinate system, the values of original pixels in the S direction may be presented by the array g[j], j=0, 1, . . . N, wherein N may be an integer. The right boundary of the pixels may be represented by $s_2, \ldots, s_j+1$. In the X-Y coordinate system, the values of target pixels in the X direction may be represented by the array f[i], i=0, 1, . . . , M, wherein M may be an integer. The right boundary of the pixels may be represented by $x_1, x_2, \ldots, x_{i+1}$. Based on a lookup table, the values of target pixels may be estimated. In some embodiments, the lookup table may be stored in the database 150. In some embodiments, the lookup table may be set up in real time. The lookup table may be configured to record the position of the left boundary of each target pixel A in the S direction of the S-T coordinate system. The values in the lookup table may be represented by the array xLut[i], wherein i=0, 1, . . . , $i_{max}$, wherein $i_{max}$ may represent the total number of the pixels in the S direction of the S-T coordinate system. For a one-dimensional coordinate system, the lookup table may be a one-dimensional array. For a two-dimensional coordinate system, the lookup table may be a two-dimensional array. For a three-dimensional coordinate system, the lookup table may be a three-dimensional array.

A value in the lookup table may include an integer part and a decimal part. The integer part may represent the index j of a pixel $g_j$, wherein the left boundary of the target pixel $f_i$ may be no smaller than the left boundary of the original pixel $g_j$, and may be smaller than the right boundary of the original pixel $g_j$, i.e., $s_j \leq x_i < s_{j+1}$. The decimal part may represent a ratio of a first difference to a second difference. The first difference may be between the left boundary of the target pixel $f_i$ and the left boundary of the original pixel $g_j$, i.e., $x_i$-$s_j$. The second difference may be between the right boundary of original pixel $g_j$ and the left boundary of original pixel $g_j$, i.e., the length of the original pixel $g_j$, $s_{j+1}$-$s_j$. As shown in FIG. 7B, the left boundary of the target pixel $f_0$ may be equal to that of the original pixel $g_0$, i.e., $x_0$-$s_0$. Apparently for persons having ordinary skills in the art, after understanding the basic principles of image transformation, the form and details may be modified or varied without departing from the principles. For example, the left boundary of the target pixel $f_0$ may be different from that of the original pixel $g_0$. The modifications and variations are still within the scope of the current disclosure described above.

To obtain the value of a target pixel f based on the lookup table, an original pixel $g_j$ may be obtained, wherein $s_j \leq x_i < s_{j+1}$. Then, sumg[j] may be calculated based on the expression below $$sumg[j] = \begin{cases} 0 & j = 0 \\ \sum_{k=0}^{j-1} g[k] \cdot (s_{k+1} - s_k) & j > 0 \end{cases} \quad (2)$$

where $g[k] \cdot (s_{k+1}-s_k)$ may represent the count of a pixel $g_k$, and sumg[i], referred to as a count sum, may represent the sum of the count of the pixel $g_{j-1}$ and counts of all pixels before the pixel $g_{j-1}$ in the original coordinate system. A pixel before the pixel $g_{j-1}$ may represent the pixel whose index may be smaller than (j−1).

Then, the value of the target pixel A may be obtained based on the expression below:

$$f[i] = \frac{1}{x_{i+1} - x_i} \quad (3)$$
$$\{sumg[j_1] - sumg[j_0] + (xLut[i+1] - j_1) \cdot g[j_1] \cdot (s_{j_1+1} - s_{j_1}) -$$
$$(xLut[i] - j_0) \cdot g[j_0] \cdot (s_{j_0+1} - s_{j_0})\},$$

where $j_0 = \lfloor xLut[i] \rfloor$, $j_1 = \lfloor xLut[i+1] \rfloor$, and the square bracket $\lfloor \rfloor$ may represent rounded down to an integer.

In some embodiments, the lookup table may merely relate to the first coordinate system and the second coordinate system. Therefore, if the first coordinate system and the second coordinate system are certain, a lookup table may be determined. In some embodiments, the storage space occupied by the lookup table may merely relate to the number of pixels in the target coordinate system, and not relating to the number of pixels in the original coordinate system or values of pixels in the target or original coordinate system. The lookup table may be insensitive to the difference between the pixel size in the original coordinate system and that in the target coordinate system. In some embodiments, the lookup table may be stored in the database 150, other modules or units capable of storing. The lookup table may be used for transformation of many images.

It should be noted that the terms "the left boundary" and "the right boundary" are used for illustration purposes, and are not intended to be limiting. Various alterations, improvements, and modifications may occur and are intended to those skilled in the art, though not expressly stated herein. For example, for vertical directions, the left boundary and the right boundary may be replaced by the lower boundary and the upper boundary. In general, the left boundary may represent the smaller boundary of a pixel with respect to a certain axis and the right boundary may represent the larger boundary of a pixel with respect to the axis. These alterations, improvements, and modifications are intended to be suggested by this disclosure, and are within the spirit and scope of the exemplary embodiments of this disclosure.

Figure 8:
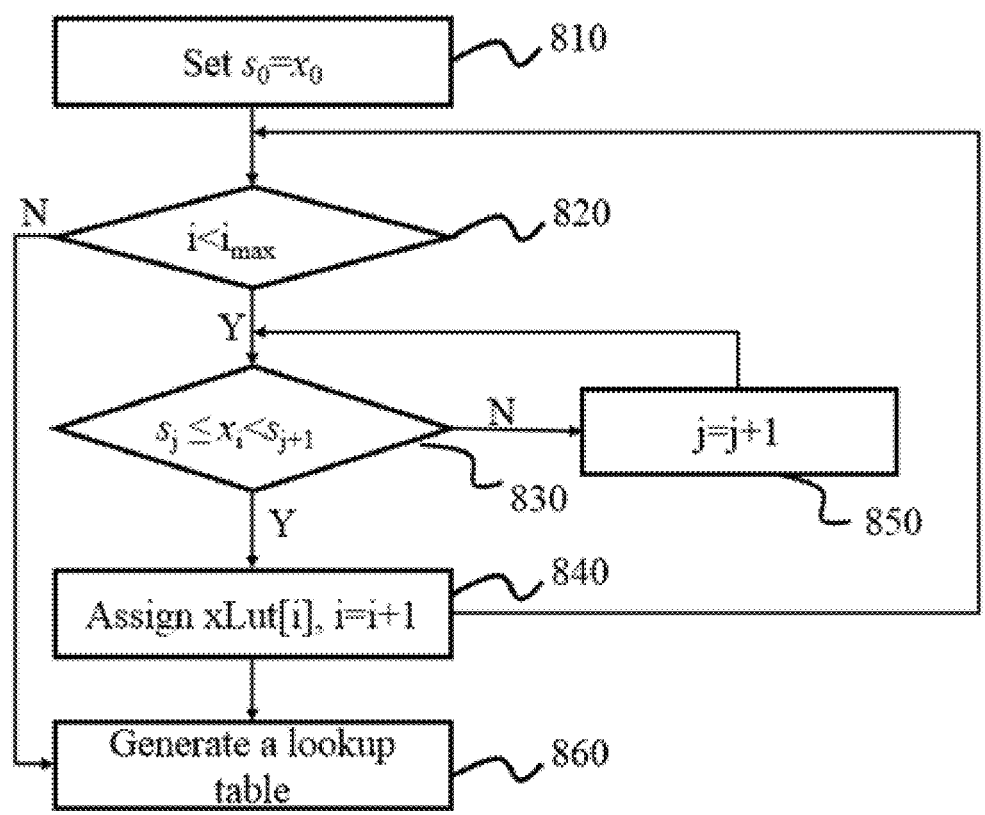
FIG. 8 illustrates a process for creating a lookup table according to some embodiments of the disclosure.

FIG. 8 shows a process of creating a lookup table in one-dimensional system according to some embodiments of the disclosure. In step 810, parameters may be set. Merely by way of example, i=0, j=0, $x_0$=$s_0$, and xLut[i]=0, 0≤i<$i_{max}$, in which the number i may represent the index of a target pixel $f_i$, and the number j may represent the index of an original pixel $g_j$.

In step 820, a determination may be made as to whether i is smaller than $i_{max}$, in which $i_{max}$ may represent the total number of target pixels in an one-dimensional coordinate system. If i<$i_{max}$, indicating the all target pixels in the second coordinate system have not been mapped with original pixels in the first coordinate system, in step 830, a determination may be made as to whether the left boundary of the target pixel A is larger than or equal to the left boundary of an original pixel $g_j$, and is smaller than the right boundary of the original pixel $g_j$, i.e., whether $s_j \leq x_i < s_{j+1}$. If $s_j \leq x_i < s_{j+1}$, a value may be assigned to xLut[i]. The assigned value may include an integer part and a decimal part. The integer part may be the index j of the original pixel $g_j$. The decimal part may be a ratio of two terms. The first term may relate to the position of target pixel relative to the position of the original pixel. For instance, the first term may be the difference between the left boundary of the target pixel $f_i$ and the left boundary of the original pixel $g_j$, i.e., $x_i$-$s_j$. The second term may relate to the pixel size of the original pixel. For instance, the second term may be the difference between the right boundary of original pixel $g_j$ and the left boundary of original pixel $g_j$, i.e., the length of the original pixel $g_j$, $s_{j+1}-s_j$. In some embodiments, in step 840, the index of the target pixel may be added by 1, and the process may return to step 820. In step 830, if the expression $s_j \leq x_i < s_{j+1}$ is not satisfied, the index of the original pixel may be added by 1 in step 850, and the process may return to step 830. In step 820, if $i < i_{max}$ is not satisfied, indicating that the all target pixels in the second coordinate system have been mapped with original pixels in the first coordinate system, a lookup table may be generated in step 860. Based on the lookup table and the expression (3), the value of a target pixel may be obtained.

It should be noted that the above description about the process for creating a lookup table is merely provided for the purposes of illustration, and not intended to limit the scope of the present disclosure. The process described in FIG. 8 is for a one-dimensional coordinate system. For persons having ordinary skills in the art, multiple variations and modifications may be made under the teachings of the present disclosure. The process described in FIG. 8 may also be applied to a two-dimensional coordinate system, a three-dimensional coordinate system, or other coordinate systems. For an n-dimensional coordinate system, a lookup table may be obtained by performing the process repeatedly as described in FIG. 8 with respect to each dimension. In some embodiments, other steps may be added in the process. For example, intermediated data and/or the final data of the process may be stored in the process, and the storage location may be in the database 150 or other modules or units capable of storing data. In some embodiments, the lookup table obtained in step 860 may be stored in the database 150. However, those variations and modifications do not depart from the scope of the present disclosure.

Figure 9:
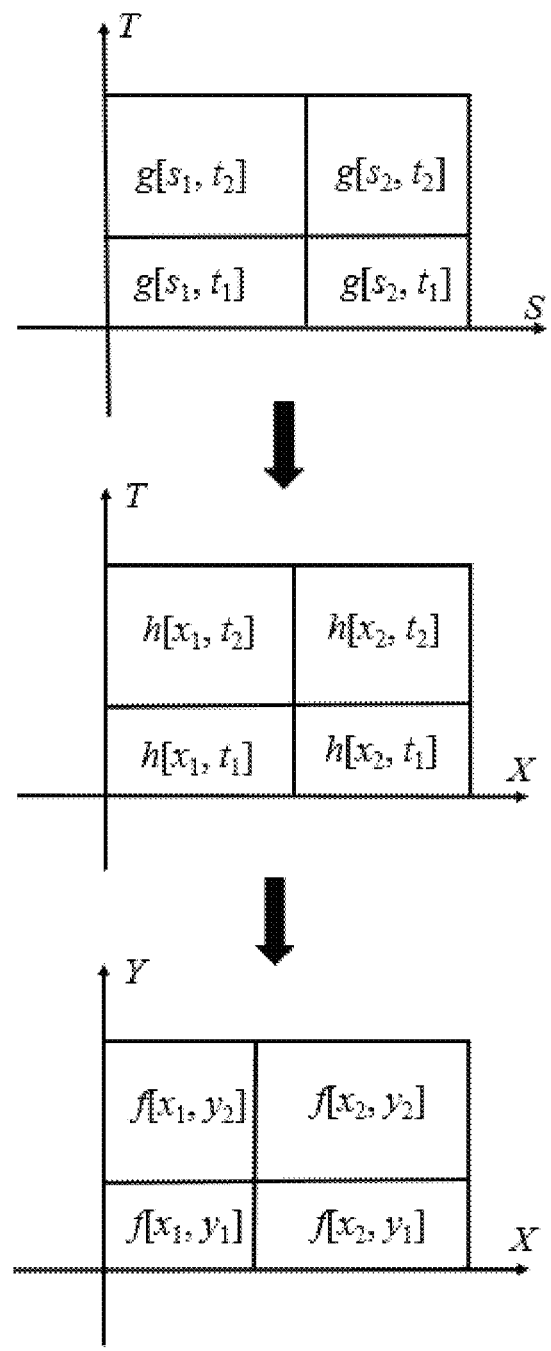
FIG. 9 shows a transformation of a two-dimensional array in two different coordinate systems according to some embodiments of the present disclosure.

FIG. 9 shows a transformation of a two-dimensional array in two different coordinate systems according to some embodiments of the present disclosure. A two-dimensional image may be represented by a two-dimensional array. In some embodiments, an image in the S-T coordinate system may be transformed to that in the X-Y coordinate system. As shown in FIG. 9, firstly, a lookup table, xLut, in the direction corresponding to S-axis or X-axis may be generated. Based on the lookup table, xLut, the two-dimensional array g[s, t] in the S-T coordinate system may be transformed to h[x, t] in the X-T coordinate system. Then, a lookup table, yLut, in the direction corresponding to T-axis or Y-axis may be generated. Based on the lookup table, yLut, the two-dimensional array h[x, t] in X-T coordinate system may be transformed to f[x, y] in the X-Y coordinate system. In some embodiments, a two-dimensional lookup table may be set up. Based on the two-dimensional lookup table, the two-dimensional array g[s, t] in the S-T coordinate system may be transformed to f[x, y] in the X-Y coordinate system.

It should be noted that the size and the number of pixels shown in FIG. 9 are merely provided for illustrating an example of image transformation, and not intended to limit the scope of the present disclosure. For example, the order of the transformation with respect to S-axis and T-axis may be exchanged, or the transformation with respect to S-axis and T-axis may be performed at the same time. As another example, the two-dimensional coordinate system may be a three-dimensional coordinate system or other dimensional coordinate system. However, those variations and modifications do not depart from the scope of the present disclosure.

Figure 10:
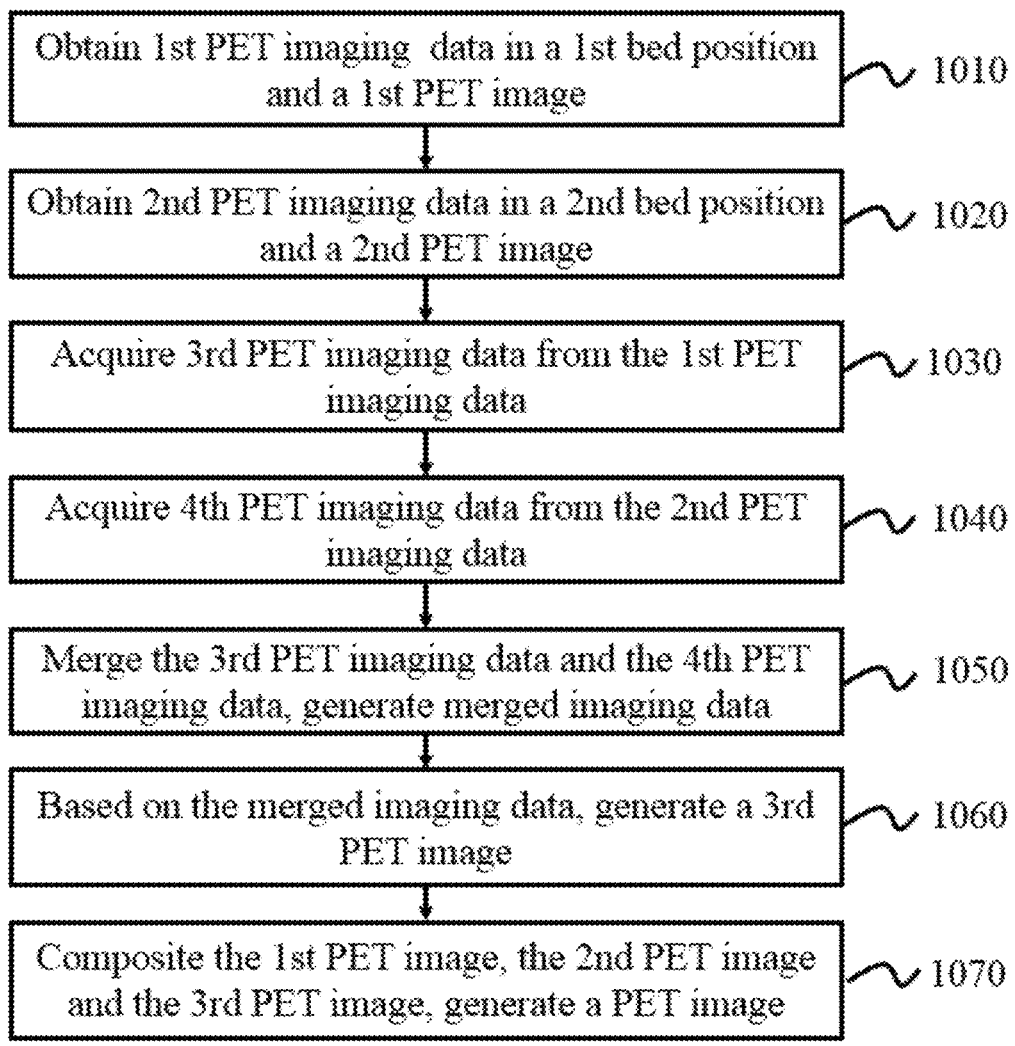
FIG. 10 illustrates a process for image composition according to some embodiments of the present disclosure.

FIG. 10 is a flowchart of an exemplary process of image composition according to some embodiments of the present disclosure. Merely by way for example, a PET image composition method may be described below, but not intended to limit the scope of the present disclosure. In step 1010, first imaging data may be obtained. The first imaging data may be from, for example, the database 150 or the imaging device 110. The first imaging data may correspond to a first bed position. In some embodiments, the first imaging data may be reconstructed to a first PET image using a reconstruction algorithm as described elsewhere in the present disclosure. The reconstruction may be performed by the reconstruction unit 220. In some embodiments, the first PET image may be obtained from the database 150.

In step 1020, second imaging data may be obtained. The second imaging data may be from, for example, the database 150 or the imaging device 110. The second imaging data may correspond to a second bed position. In some embodiments, the second imaging data may be reconstructed to a second PET image using a reconstruction algorithm as described elsewhere in the present disclosure. The reconstruction algorithm used herein may be the same as or different from that in step 1010. The reconstruction may be performed by the reconstruction unit 220. In some embodiments, the second PET image may be obtained from the database 150. It should be noted that the order of step 1010 and step 1020 may also be exchanged or they may be performed at the same time.

In some embodiments, the first imaging data and the second imaging data may be in a listmode format. A coincidence event may be recorded as (ia, ib, ra, rb), in which (ia, ib) may represent the circumferential positions of two detector elements that may detect a coincidence event, and (ra, rb) may represent the axial positions of two detector elements that detect the coincidence event. In some embodiments, the first imaging data and the second imaging data may be in a sinogram format. In some embodiments, the first bed position and the second bed position may overlap. A portion of an object under examination may be scanned twice at the two bed positions.

In step 1030, third imaging data may be exacted from the first imaging data. In some embodiments, the third imaging data may be from coincidence events occurred in the overlapping region at the first bed position. The coincidence events may belong to two categories. The first category may be that both of two gamma photons belonging to a coincidence event are detected by two detector elements that cover the overlapping region. The second category may be that one of two gamma photons belonging to a coincidence event is detected by a detector element that covers the overlapping region and the other gamma photon is detected by a detector element that does not cover the overlapping region. As used herein, a detector element covering the overlapping region may mean that the detector element is located at approximately the same position as the overlapping region along the axial direction of the detector. For instance, a detector element covering the overlapping region may indicate that the detector element is directly or almost directly above or below of the overlapping region. In some embodiments, the third imaging data may be from a portion of the coincidence events occurred in the overlapping region in the first bed position. In some embodiments, the coincidence events occurred in the overlapping region may only include some or all of the coincidence events of the first category. In some embodiments, the coincidence events occurred in the overlapping region may only include some or all of the coincidence events of the second category. In some embodiments, part of the coincidence events occurred in the overlapping region may only include the coincidence events of the first category, and part of the coincidence events in the second category. In some embodiments, the coincidence events occurred in the overlapping region may include coincidence events of the first category and coincidence events of the second category.

In step 1040, fourth imaging data may be exacted from the second imaging data. In some embodiments, the fourth imaging data may be from coincidence events occurred in the overlapping region at the second bed position. The description about the fourth imaging data may be similar to that of the third imaging data, and is not repeated here. In some embodiments, step 1030 and step 1040 may be performed in serial. In some embodiments, step 1030 and step 1040 may be performed simultaneously. The third imaging data and the fourth imaging data may be arranged according to a factor including, for example, an angle of a relevant LOR, the sampling time, etc.

In step 1050, the third imaging data and the fourth imaging data may be merged together to provide merged imaging data. The merged imaging data may be in a listmode format or in a sinogram format. At different bed positions, coincidence events occurred in an overlapping region may be detected by different axial detector elements. Therefore, the third imaging data and the fourth imaging data may be transformed to a same coordinate system before being merged.

In step 1060, the merged imaging data may be reconstructed by using a reconstruction algorithm to generate a third PET image. In some embodiments, the reconstruction algorithm used herein may be the same as the reconstruction algorithm used in step 1010 or step 1020. In some embodiments, the reconstruction algorithm used herein may be different from the reconstruction algorithm used in step 1010 or step 1020. In some embodiments, the overlapping region may be imaged or scanned by one or more detector elements near one axial end of the detector at one bed position, and therefore only part of coincidence events in the overlapping region may be detected.

In step 1070, the first PET image, the second PET image, and the third PET image may be composited to generate a composite PET image. The composite PET image may include three portions. The first portion may be the same as the non-overlapping region of the first PET image. The second portion may be the same as the non-overlapping region of the second PET image. The third portion may relate to all or part of the overlapping region of the first PET image, the overlapping region of the second PET image, and the third PET image.

In some embodiments, the overlapping region of the first PET image and the overlapping region of the second PET image may be not used to generate the third portion of the composite PET image. In some embodiments, the overlapping region of the first PET image and the overlapping region of the second PET image may be also used to generate the composite PET image. In this case, the overlapping region of the first PET image, the overlapping region of the second PET image, and the third PET image may be taken into consideration; the contribution of each to the composite image may be regulated or manipulated by way of assigning a weight coefficient. The weight coefficient corresponding to the overlapping region of the first PET image may be referred to as a first weight coefficient, the weight coefficient corresponding to the overlapping region of the second PET image may be referred to as a second weight coefficient, and the weight coefficient corresponding to the third PET image may be referred to as a third weight coefficient. In some embodiments, the three weight coefficients may be constants. In some embodiments, one or more of the three weight coefficients may relate to a factor including, for example, an overlapping ratio, the SNR of a relevant image, etc. In some embodiments, one or more of the three weight coefficients may follow a polynomial function. The highest degree of the polynomial function may be an arbitrary value including, e.g., one, two, three, four. In some embodiments, the sum of the three weight coefficients may be one.

It should be noted that the above description about the process of image composition is merely provided for the purposes of illustration, and not intended to limit the scope of the present disclosure. For persons having ordinary skills in the art, multiple variations and modifications may be made under the teachings of the present disclosure. In some embodiments, other steps may be added in the process. For example, intermediated data and/or the final data of the process may be stored in the process, and the storage location may be in the database 150 or other modules or units capable of storing data. In some embodiments, the imaging data acquired in step 1010 and 1020 may be corrected by the correction unit 240 before being reconstructed. The correction may include random correction, scatter correction, attenuation correction, dead time correction, uniformity correction, or the like, or any combination thereof. Besides, the imaging device 110 may scan the object in more than two bed positions. In some embodiments, there may be an overlapping region between two adjacent bed positions. In some embodiments, there may be no overlapping region between two adjacent bed positions. Merely by way of example, for scans at three bed positions, the first bed position and the second bed position may overlap, and the second position and the third position may also overlap. For scans at four bed positions, the first bed position and the second bed position may overlap, the second position and the third position may not overlap, and the third bed position and the fourth bed position may overlap. However, those variations and modifications do not depart from the scope of the present disclosure.

Figure 11:
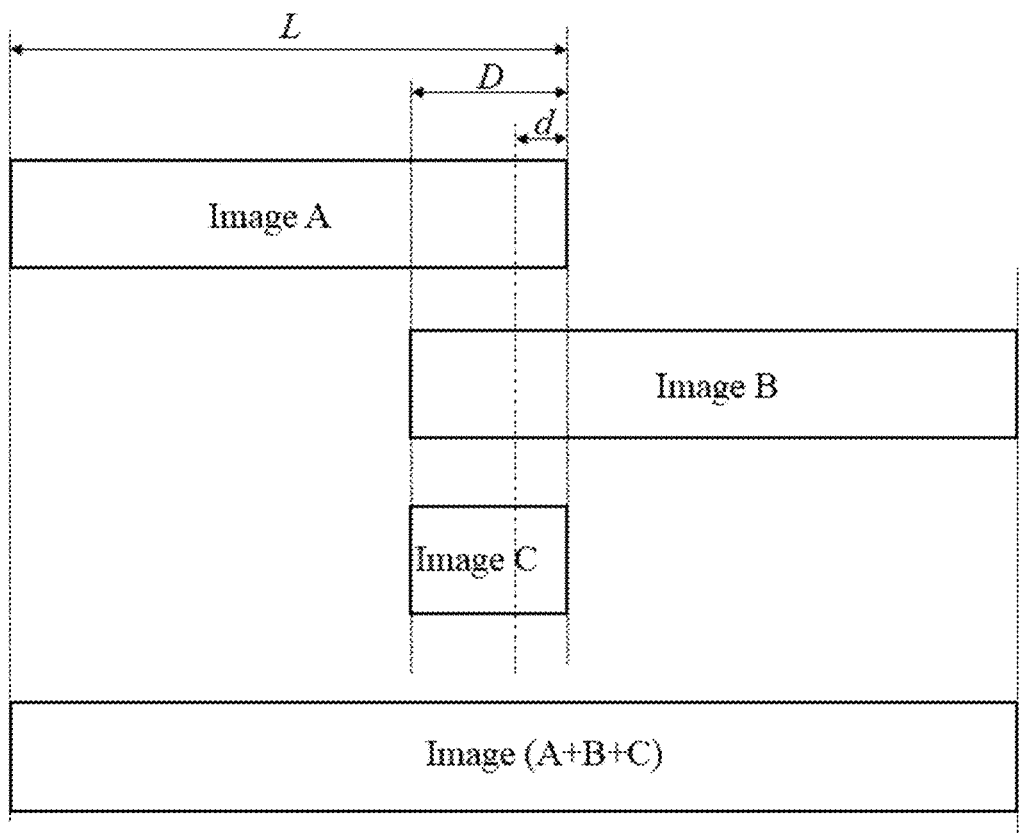
FIG. 11 shows a schematic of image composition according to some embodiments of the present disclosure.

FIG. 11 shows a schematic of image composition according to some embodiments of the present disclosure. As shown in FIG. 11, image A may represent a first PET image, image B may represent a second PET image, image C may represent a third PET image, and image (A+B+C) may represent a composite PET image. The length of the image A may be L, and the length of the image B may also be L. The overlapping region of the image A may be of a length D, and the overlapping of the image B may also be of a length D. The distance between a pixel in the overlapping region of an image and the edge of the image in the axial direction may be d. In some embodiments, the overlapping region of the image A may be multiplied by a weight coefficient $\mu_A(d)$, the overlapping region of the image B may be multiplied by a weight coefficient $\mu B(d)$, and the image C may be multiplied by a weight coefficient $\mu c(d)$. In some embodiments, the sum of the three weight coefficients may be one, as described below:

$$\mu_A(d)+\mu_B(d)+\mu_C(d)=1. \quad (4)$$

Exemplary $\mu_A(d)$, $\mu_B(d)$, and $\mu_C(d)$ may be determined as the expressions below:

$$\mu_A(d) = \begin{cases} 0 & 0 \le d < 0.5D \\ \dfrac{2d}{D} - 1 & 0.5D \le d < D \end{cases}, \quad (5)$$

$$\mu_B(d) = \begin{cases} 0 & 0.5D \le d < D \\ 1 - \dfrac{2d}{D} & 0 \le d < 0.5D \end{cases} \quad (6)$$

and $$\mu_C(d) = \begin{cases} 2 - \dfrac{2d}{D} & 0.5D \le d < D \\ \dfrac{2d}{D} & 0 \le d < 0.5D \end{cases} \quad (7)$$

It should be noted that the above description about image composition is merely provided for the purposes of illustration, and not intended to limit the scope of the present disclosure. For persons having ordinary skills in the art, multiple variations and modifications may be made under the teachings of the present disclosure. For example, the number of images to be composited may be arbitrary. The length of image to be composited may be the same with or different from each other. In some embodiments, the weight coefficients may be relative to other factors. The relationship between the factors and the weight coefficients may be varied or modified. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "unit," "component," "device" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image processing, the system comprising:
a processor; and
a non-transitory computer readable storage medium storing computer-executable instructions that when executed cause the processor to perform operations comprising:
receiving first data of an object at a first bed position and second data of the object at a second bed position; wherein the first bed position and the second bed position having an overlapping region corresponding to a same portion of the object;
reconstructing a first image based on the first data;
reconstructing a second image based on the second data, a region in the at least one of the first image or the second image representing the same portion of the object having a signal noise ratio (SNR) lower than a region in the at least one of the first image or the second image representing another portion of the object;
extracting third data corresponding to the overlapping region from the first data;
extracting fourth data corresponding to the overlapping region from the second data, the third data and the fourth data representing at least a portion of the same portion of the object;
merging the third data and the fourth data to generate merged data;
reconstructing a third image based on the merged data; and
generating a fourth image of the object through image composition based on the first image, the second image, and the third image, wherein the fourth image having a substantially uniform SNR.

2. The system of claim 1, the generating a fourth image comprising weighted composition based on a first weight coefficient for the first image, a second weight coefficient for the second image, and a third weight coefficient for the third image.

3. The system of claim 2, a sum of the first weight coefficient, the second weight coefficient, and the third weight coefficient being a fixed value.

4. The system of claim 1, the first data, the second data, the third data, and the fourth data being saved in a sinogram mode or a listmode.

5. The system of claim 1, the operations further comprising
correcting the first data, the second data, or the merged data.

6. The system of claim 1, the operations further comprising arranging the merged data based on angle or time.

7. The system of claim 1, the system being a Positron Emission Tomography (PET) system.

8. A system for image processing, the system comprising:
a processor; and
a non-transitory computer readable storage medium storing computer-executable instructions that when executed cause the processor to perform operations comprising:
a) obtaining image data including a plurality of original pixels in a first coordinate system;
b) obtaining a lookup table specifying a correlation between the first coordinate system and a second coordinate system applied to a target image, the lookup table recording a position of each of a plurality of target pixels in the target image in the first coordinate system, the position of each of a plurality of target pixels being defined by positions of one or more original pixels of the image data in the first coordinate system; and
c) for each of the plurality of target pixels in the target image, calculating a value of the target pixel in the second coordinate system based on the lookup table and values of the one or more original pixels of the image data in the first coordinate system.

9. The system of claim 8, each entry in the lookup table comprising an integer part and a decimal part.

10. The system of claim 9, the integer part of the entry in the lookup table comprising an index of original pixel relating to the left boundary of a target pixel.

11. The system of claim 9, the decimal part of the entry in the lookup table comprising a ratio of a first term to a second term, the first term relating to the position of a target pixel relative to the position of a corresponding original pixel, and the second term relating to the pixel size of the corresponding original pixel.

12. The system of claim 8, the operations further comprising calculating a count sum, wherein the count sum being a sum of a count of a pixel and counts of all pixels before the pixel in the first coordinate system; and wherein each count being a product of a pixel value and a size of the original pixel.

13. The system of claim 12, calculating a value of the target pixel in the second coordinate system based on the lookup table and the image data relating to one or more of the plurality of original pixels in the first coordinate system further comprising based on the count sum.

14. The system of claim 8, the first coordinate system being multi-dimensional, the operations further comprising performing b) and c) for each dimension of the first coordinate system.

15. A method for image processing, the method comprising:
- receiving first data of an object at a first bed position and second data of the object at a second bed position, the first bed position and the second bed position having an overlapping region corresponding to a same portion of the object;
- reconstructing a first image based on the first data;
- reconstructing a second image based on the second data, a region in the at least one of the first image or the second image representing the same portion of the object having a signal noise ratio (SNR) lower than a region in the at least one of the first image or the second image representing another portion of the object;
- extracting third data corresponding to the overlapping region from the first data;
- extracting fourth data corresponding to the overlapping region from the second data, the third data and the fourth data representing at least a portion of the same portion of the object;
- merging the third data and the fourth data to generate merged data;
- reconstructing a third image based on the merged data; and
- generating a fourth image of the object through image composition based on the first image, the second image, and the third image, wherein the fourth image having a substantially uniform SNR.

16. The method of claim 15, the generating a fourth image comprising weighted composition based on a first weight coefficient for the first image, a second weight coefficient for the second image, and a third weight coefficient for the third image.

17. The method of claim 16, a sum of the first weight coefficient, the second weight coefficient, and the third weight coefficient being a fixed value.

18. The method of claim 15, the first data, the second data, the third data, and the fourth data being saved in a sinogram mode or a listmode.

19. The method of claim 15, further comprising
- correcting the first data, the second data, or the merged data.

20. The method of claim 15, further comprising arranging the merged data based on angle or time.

* * * * *